Aug. 21, 1923.

E. L. BAILEY

ROTARY CAR DUMP

Filed Nov. 14, 1919

Inventor
E. L. Bailey,
By
Attorney

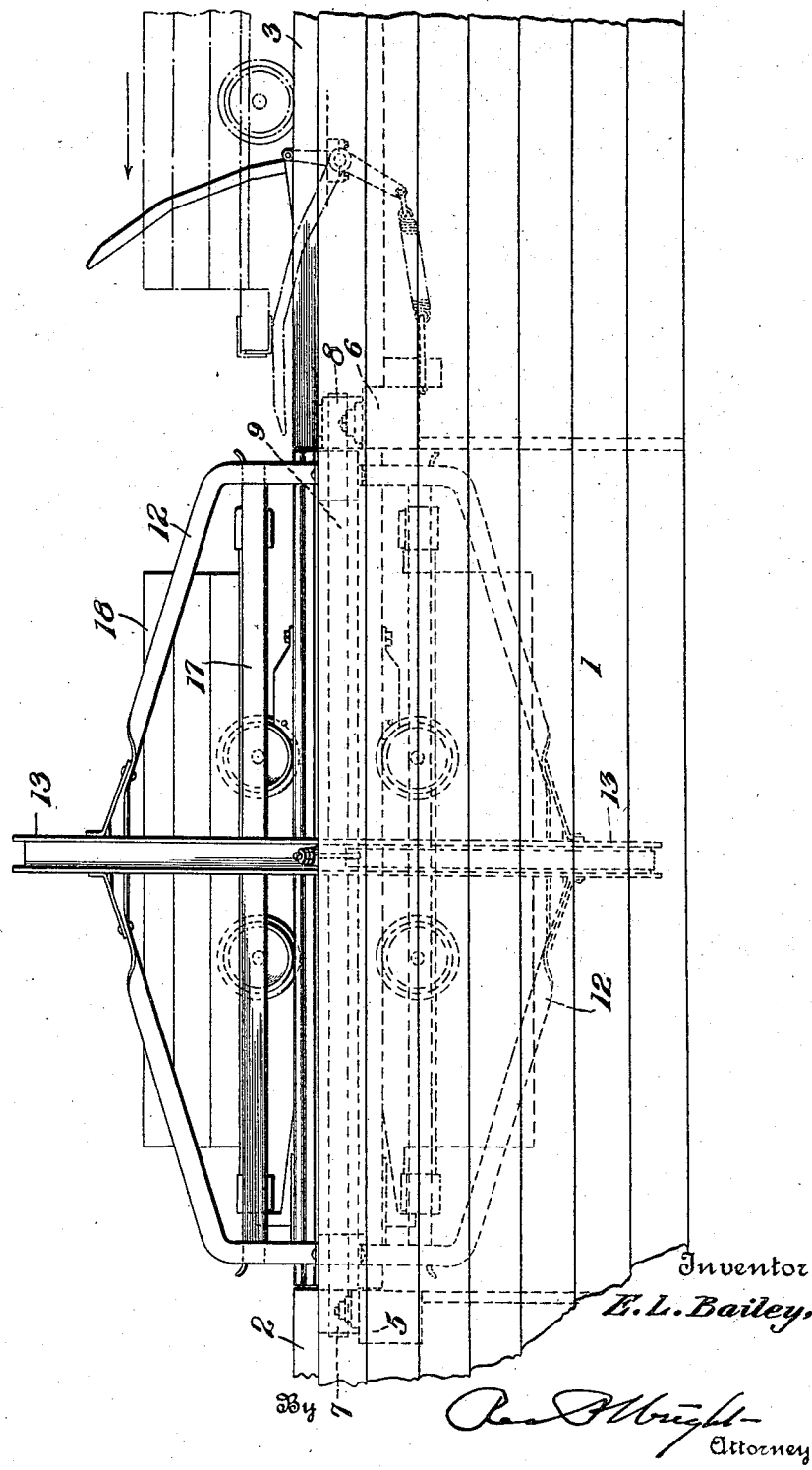

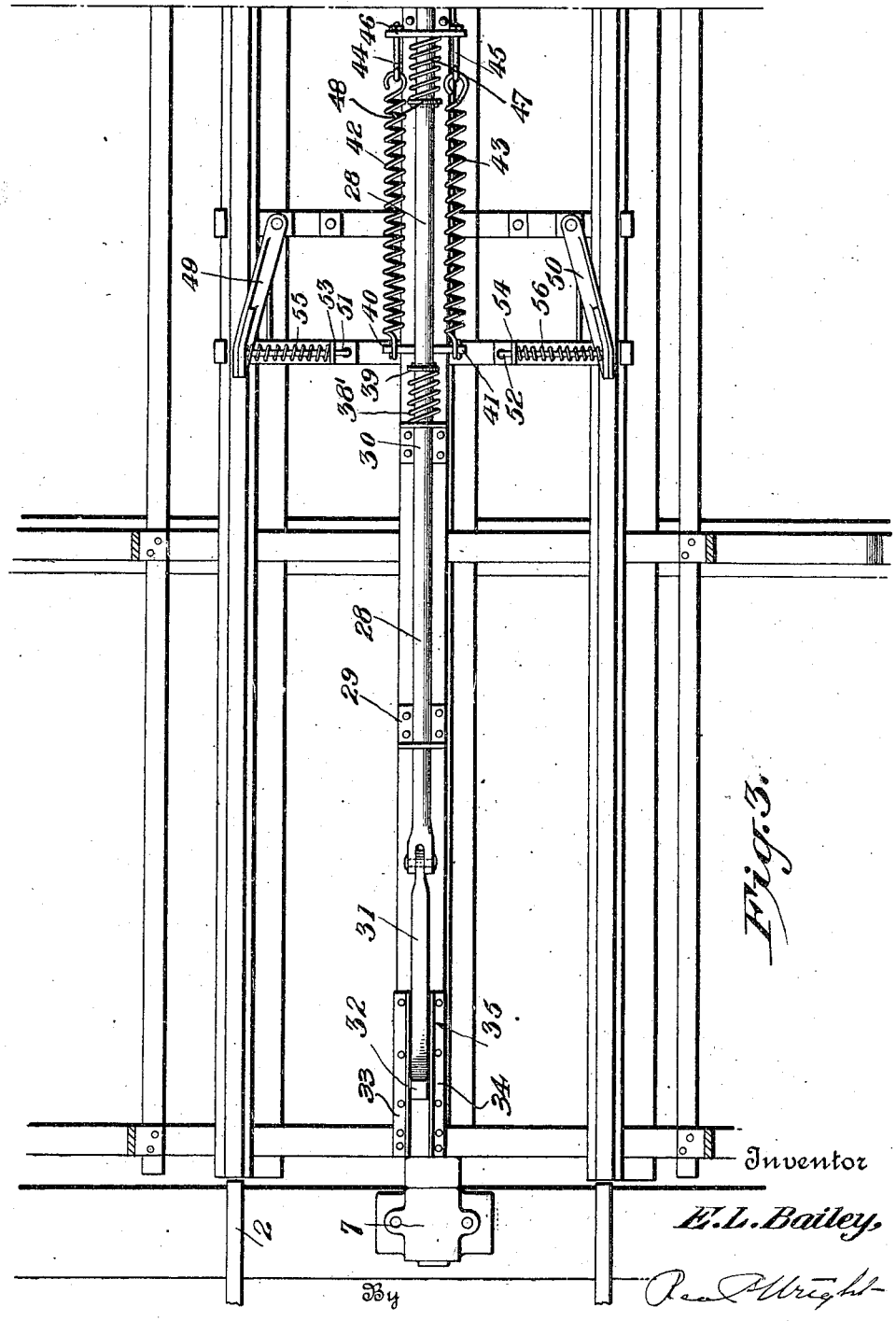
Aug. 21, 1923.
E. L. BAILEY
ROTARY CAR DUMP
Filed Nov. 14, 1919
1,465,661
7 Sheets-Sheet 3

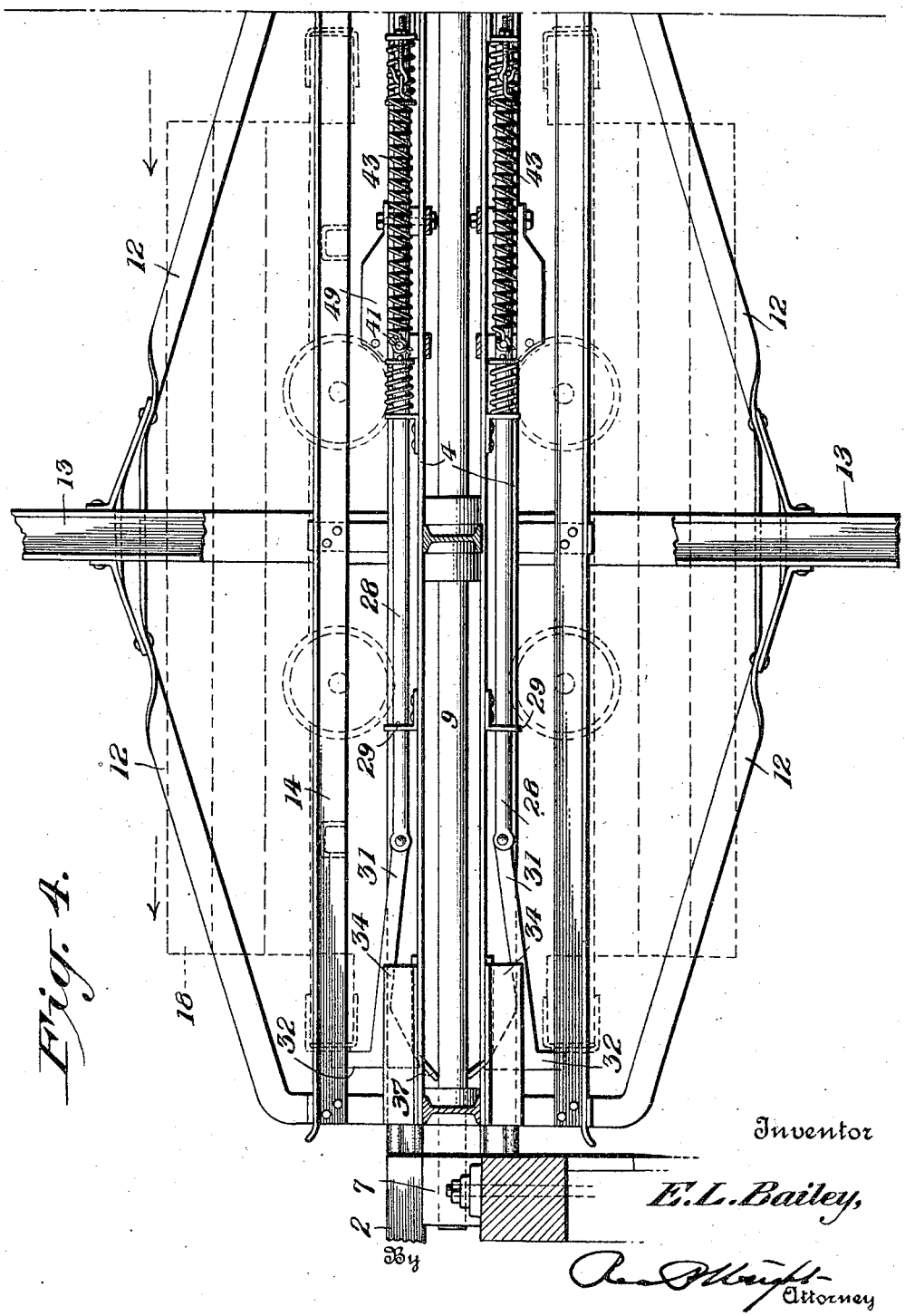

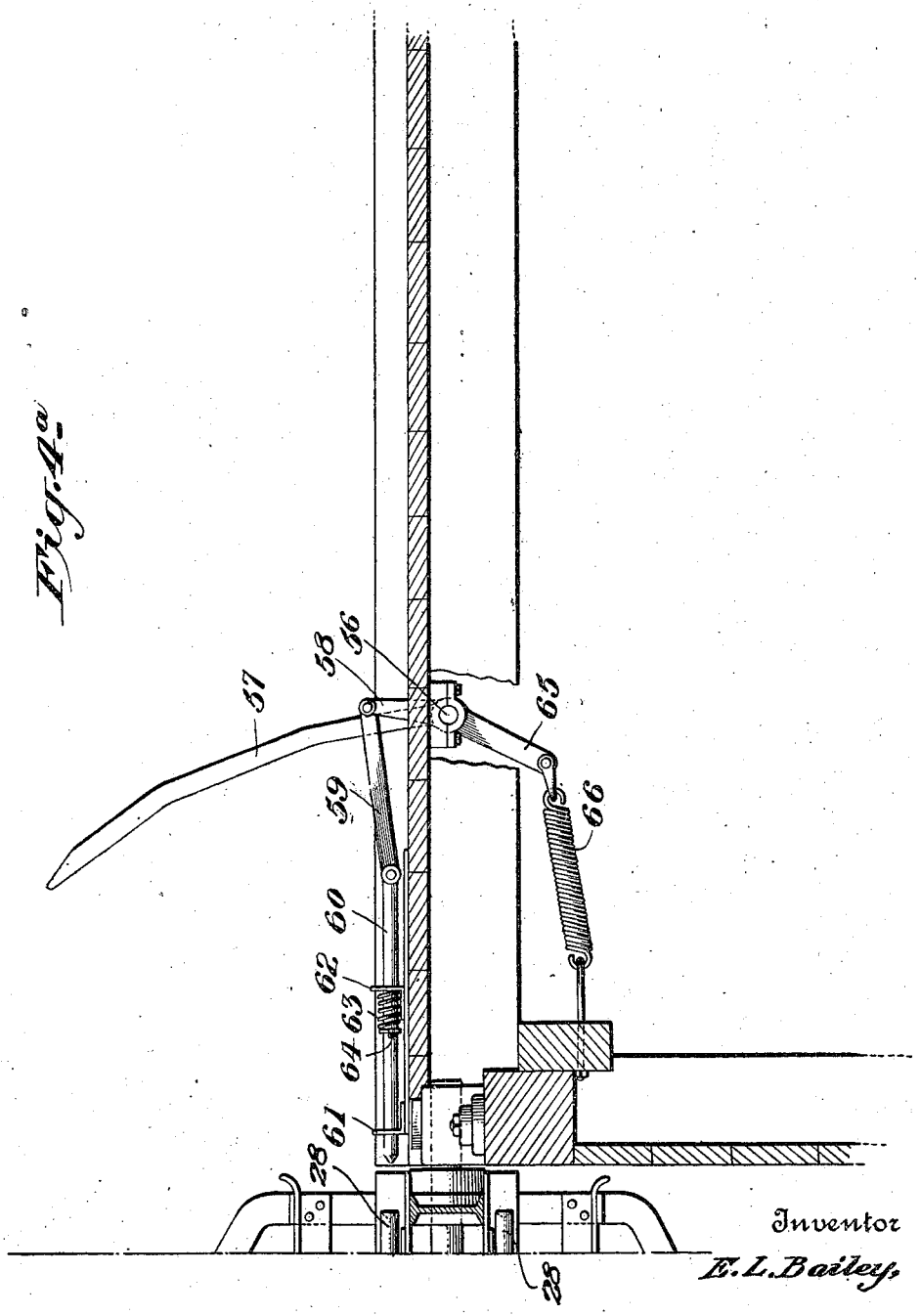

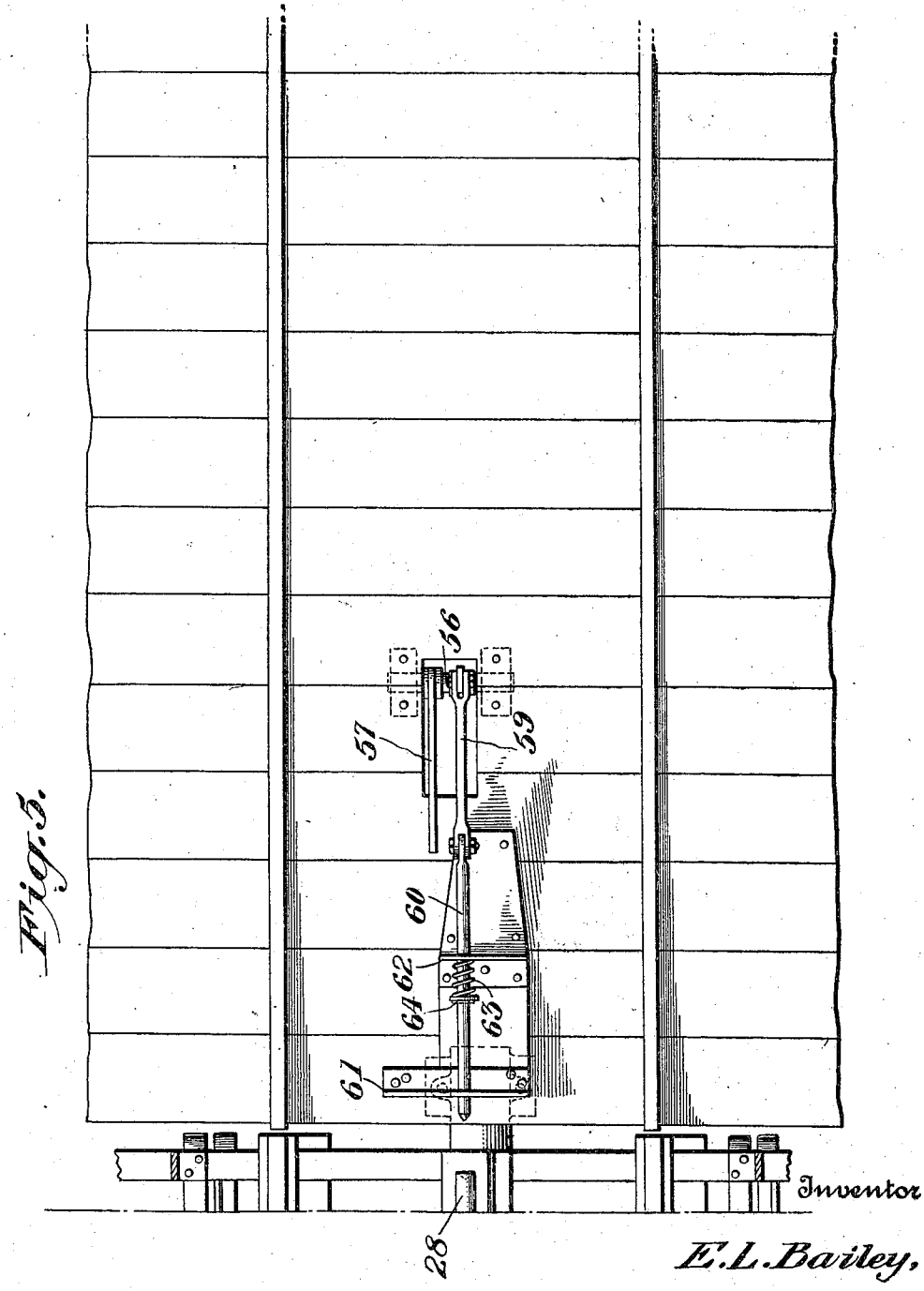

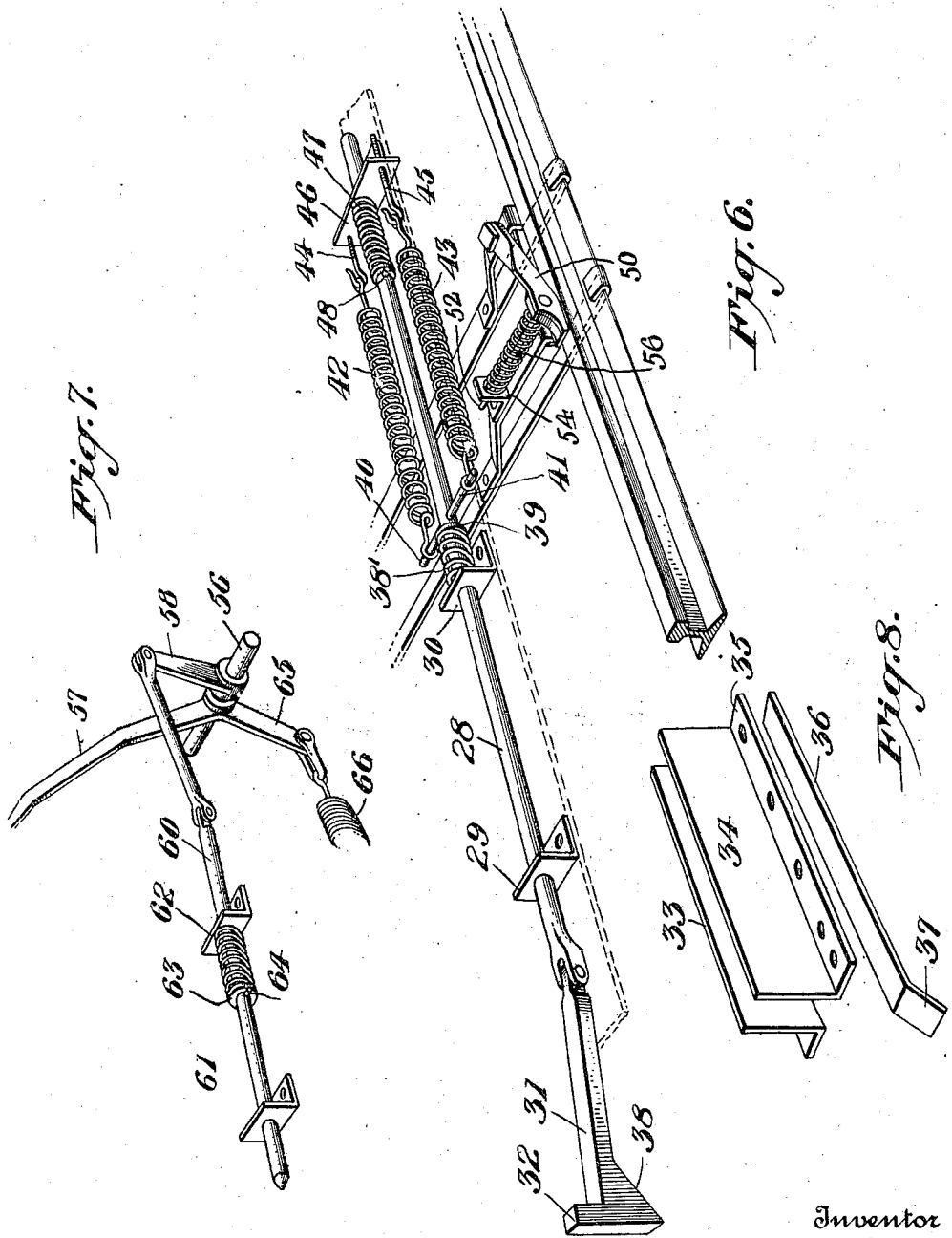

Patented Aug. 21, 1923.

1,465,661

UNITED STATES PATENT OFFICE.

EMMETT L. BAILEY, OF WILLIAMSON, WEST VIRGINIA, ASSIGNOR OF ONE-HALF TO ROBERT L. BAILEY, OF WILLIAMSON, WEST VIRGINIA.

ROTARY CAR DUMP.

Application filed November 14, 1919. Serial No. 337,904.

*To all whom it may concern:*

Be it known that I, EMMETT L. BAILEY, a citizen of the United States, residing at Williamson, in the county of Mingo and State of West Virginia, have invented certain new and useful Improvements in Rotary Car Dumps, of which the following is a specification, reference being had therein to the accompanying drawing.

My invention relates to improvements in rotary car dumps.

The object of my invention is to provide an apparatus of this character in which a car is run upon a rotating platform and the same turned completely over for dumping the car and another run upon the platform for tilting the platform and bringing the previously dumped car in an upright position.

Another object of my invention is to provide means for locking the car on the tracks against movement in either a forward or backward direction, the forward locking means being released by the approach of another car whereby a full car can be used to push the previously dumped car from the rotating platform, and the rearward locking means being automatically operated by the wheels of the cars.

A still further object of my invention it to provide a simple, cheap and effective apparatus of this character, having certain details of structure and combination of parts hereinafter more fully described.

In the drawings:

Fig. 2 is a side elevation of Fig. 1, showing a car on the platform and another car in dotted lines in the act of releasing the one on the platform.

Fig. 3 is a top plan view showing the means for preventing the forward and rearward movement of the car on the track on the platform.

Fig. 4 is an enlarged vertical sectional view taken at right angles to Fig. 1.

Figure 1:
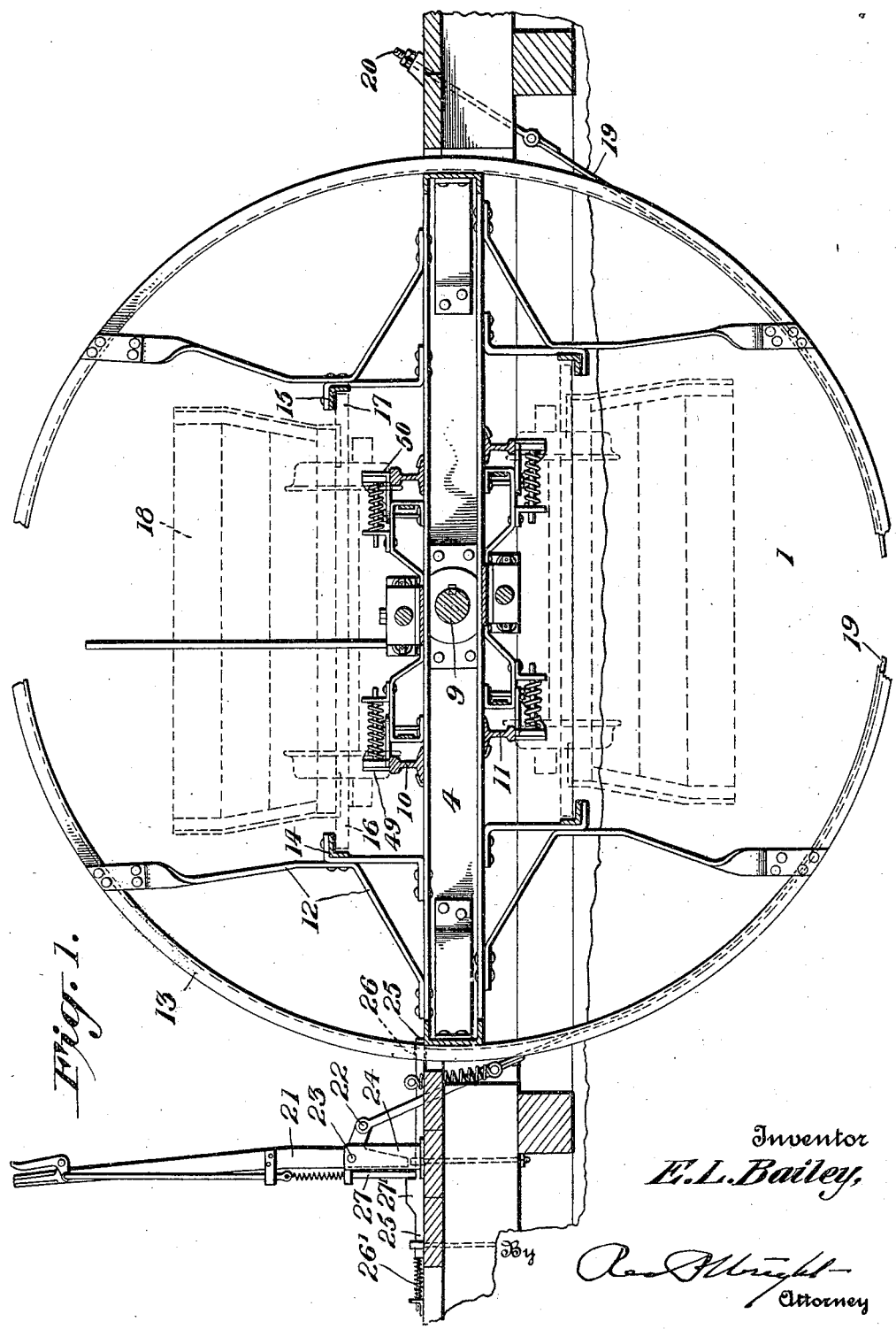
Fig. 1 is a transverse vertical sectional view of my improved dumping apparatus.

Fig. 4ª is an enlarged vertical sectional view showing a continuation of Fig. 4.

Fig. 5 is a top plan view of that portion of the apparatus shown in Fig. 4ª.

Fig. 6 is a perspective of the means for holding the car on the track against forward or backward movement.

Fig. 7 is a perspective view of the releasing mechanism for operating the holding means, and Fig. 8 is a perspective view of the guide for the forward holding means.

Referring now to the drawings, 1 represents a pit into which the contents of the cars are to be dumped and on each side thereof are arranged the railway tracks 2 and 3, whereby the cars may be run on the platform 4, covering the pit 1, from one side and off to the other side. On two opposite sides of the pit at right angles to the tracks 2 and 3, are arranged the abutments 5 and 6, carrying bearings 7, and 8, in which is rotatably mounted the shaft 9, carried by the platform 4, covering the pit 1. As will be seen in Fig. 1 of the drawings, the shaft 9 is exactly in the center of the platform 4, and the tracks are off center whereby the same will rotate automatically upon the entrance of a car on the tracks 10 and 11, on the platform and on the releasing of the holding means the platform will rock and make a half turn so that the car thereon will be turned completely over. As will be seen in Fig. 1 of the drawings there are tracks on both sides of the platform whereby a loaded car will rotate the platform to bring the previously dumped empty car up so that it can be run off the platform.

The platform 4, is made of angle irons or in any desired manner and is provided with the steel framing 12, supporting the brake drum 13, whereby the movement of the platform can be governed. The framing 12 is provided with angle irons 14 and 15, extending inwardly over the flanges 16 and 17, carried by the car 18, and which is adapted to support the car when the platform has been turned over to dump the car as will be seen by reference to Fig. 1 of the drawings.

The platform surrounding the rotating platform has a brake band 19, secured thereto at 20, and the opposite end is secured to one end of the lever 21, at 22, which is pivotally connected at 23 in the frame 24, carried by the platform. Below the lever 21 is a sliding bolt 25 adapted to enter an opening 26 in the brake drum arranged in a certain position so that the rotating platform is locked in a horizontal position so that it cannot rotate while the car is being pushed on or off the same. The sliding bolt is normally held in an inward position by a spring 26', and a lever operated detent 27 is adapted to engage a projection 27' carried by the bolt whereby the inward movement of the lever operates the bolt and simultaneously releases the brake band so that the platform will be rotated. The brake band can then be tightened to allow the platform to slowly rotate and the bolt will ride on the brake drum until it comes opposite the opening in the opposite side of the drum at which time the platform has been completely turned over with the loaded car inverted and the empty car in an upright position so it can be run off of the platform.

In order to prevent the car from moving forward or backward on the rails while on the rotating platform, I provide the same with a sliding rod 28, arranged midway between the rails and carried by the plates 29 and 30 which has its forward end provided with a pivoted lock or catch 31. This catch has at its forward end an upwardly extending portion 32, adapted to engage the forward end of the car and prevent it from moving beyond a given point. The catch 31 slides between the side walls 33 and 34 of the housing 35. The housing 35 has in its bottom a plate 36, which has its outer end turned downwardly at 37, on which is adapted to ride the beveled face 38, of the lower edge of the catch 31, and whereby the catch is thrown upwardly when the rod is in its rearward position to engage the forward end of the car. Upon the forward movement of the catch (the operation of which will be hereinafter described), the catch slides down upon the beveled face 37, of the plate 36, below the forward end of the car and allows of the forward movement thereof.

The rod 28, in rear of the plate 30, has a coiled spring 38', surrounding the same and abutting against the plate and the opposite end bearing against a collar 39, carried by the shaft and normally having a rearward tension on the shaft. In the rear of the collar the rod 28 is provided with outwardly extending arms 40 and 41, to which are connected the coil springs 42 and 43, which have their rear ends connected to the adjustable eye bolts 44 and 45, adjustably connected to the guide plate 46, through which the rod 28 passes, and whereby a further rearward tension is exerted upon the rod 28. Surrounding the shaft 38, in the front of the plate 46, is a coiled spring 47, which bears against the plate and the opposite end bearing against the collar 48' and normally forcing the rod 38 forward. The springs 38' and 47 as will be seen by reference to Fig. 6 of the drawings, form means for taking up the sudden forward and rearward thrust of the springs 42 and 43.

Carried by the platform on the inside of the rails are two pivoted plates 49, and 50, the lower face of which is pivoted in a plane with the upper face of the rails and their free ends adapted to swing over above the face of the rails. In order to normally hold the plates 49 and 50 in the position shown in Figs. 3 and 6 of the drawings, the same have connected thereto rods 51 and 52, which extend inwardly through guides 53 and 54 and have means on their inner ends to prevent the plates 49 and 50 from moving out beyond the upper face of the rails as shown in Fig. 3 of the drawings. Surrounding the rods between the plates and the guides are coil springs 55 and 56, which normally hold the plates 49 and 50 in their outward position above the face of the rails. The car wheels are adapted to engage the edge of the plates between their pivoted and free ends and force the same inwardly and after the car has passed, the springs force them outwardly and form clutches to prevent the rear movement of the car on the rotating platform.

The platform at one end of the rotating platform has rotatably mounted therein, a shaft 56 which is provided with an upwardly extending arm 57, adapted to be forced down into the position shown in Fig. 2, by engagement with the bottom of the car. Carried by the shaft 56, is an arm 58 to which is pivotally connected a link 59, having its forward end pivotally connected to the sliding rod 60. The rod passes loosely through the guide plates 61 and 62, and is in line with the rod 28 and adapted to enter a recess in the rear end thereof, whereby the forward movement of the rod 60, causes the rod 28 to move forward and release the latch 31, and allow the on-coming loaded car to push the empty car from the rotating platform. The rod 60 has a coiled spring 63, which engages the pin 64 and forms a cushion to prevent the sudden return of the rod after the car has passed over the arm 57. The shaft 56 is provided with a downwardly extending arm 65 to which is connected the coiled spring 66, which has its opposite end connected to the platform, and normally holds the shaft in a position with the arm 57 in a raised position so that the rod 60 is retracted.

In operation it will be seen that the loaded car is run on the track and the automatic clutches hold it on the platform 4 against forward or backward movement. The lever 21 is moved to the right (Fig. 1) releasing the bolt 25, and also the brake band 19. The platform by the weight of the loaded car will swing down and by means of the brake band rotating movement can be regulated so as not to move too rapidly and after the loaded car has been completely turned over the bolt 25 enters the opening 26 in the opposite side of the brake drum. Another car as shown in Fig. 2 is moved forward which throws the arm 57 down, releasing the latch, and allows the oncoming car to push the empty car from the platform.

What I claim is:

1. An apparatus for unloading cars, comprising a rotating member adapted to support a car upon opposite sides, and rotated by the force of gravity, and automatic means for holding the car on the tracks against forward and rearward movement.

2. An apparatus for unloading cars, comprising a rotating member adapted to support a car upon opposite sides and rotated by the force of gravity, automatic means for locking the car on the tracks against rearward movement, and separate automatic means for locking the car on the tracks against forward movement.

3. An apparatus for unloading cars, comprising a rotating member adapted to support a car upon the opposite sides and rotated by the force of gravity, automatic means for locking the car on the tracks against rearward movement and separate automatic means engaging the front end of the car and locking it against forward movement on the tracks.

4. An apparatus for unloading cars, comprising a rotating member adapted to support a car upon the opposite sides and rotated by the force of gravity, automatic means for locking the car on the tracks against rearward movement, separate automatic means engaging the front end of the car, and locking it against forward movement on the track, and means operated by an in-coming car for operating the last mentioned automatic locking means.

5. An apparatus for unloading cars, comprising a rotating member adapted to support a car upon the opposite sides and rotated by the force of gravity, automatic means released by the car wheels for locking the car on the tracks against rearward movement, and automatic means engaging the front end of the car and locking it against forward movement.

6. An apparatus for unloading cars, comprising a rotating member adapted to support a car upon the opposite sides and rotated by the force of gravity, a sliding latch automatically held in raised position to engage the forward end of the car and limit the forward movement of the car, and means operated by an incoming car for moving the latch forward for disengaging it from the car on the rotating member to allow the forward movement thereof.

7. An apparatus for unloading cars, comprising a rotating member adapted to support a car upon opposite sides and rotated by the force of gravity, a sliding latch held in a raised position to engage the forward end of the car and limit the forward movement of the car, and means operated by an incoming car for moving the latch forward to allow it to fall by gravity to disengage the car on the rotating member to allow the forward movement thereof.

8. An apparatus for unloading cars, comprising a rotating member adapted to support a car upon opposite sides and rotated by the force of gravity, pivoted spring pressed chocks adapted to be forced inward by the car wheel to allow the car to pass on the rotating member and moved outwardly over the rail to chock the wheels to prevent the rearward movement of the car, a sliding member normally rearwardly spring held, means outside of the rotating member for engaging the rod and moving it forward and operated by the on coming car and a pivoted latch carried by the rod and operated by the longitudinal movement thereof for engaging and disengaging the latch with the car on the rotating member.

9. An apparatus for unloading cars, comprising a rotating member adapted to support a car upon opposite sides and rotated by the force of gravity, pivoted spring pressed chocks adapted to be forced inward by the car wheel to allow the car to pass on the rotating member and outwardly over the rail to chock the wheels to prevent the rearward movement of the car, a sliding member normally rearwardly spring held, a pivoted latch carried by the rod and sliding in a guide adapted to raise and lower the latch by the longitudinal movement of the rod, and means outside of the rotating member for operating the rod for moving it longitudinally for raising and lowering the latch and operated by the on coming car.

10. An apparatus for unloading cars, comprising a rotating member adapted to support a car upon opposite sides, and rotated by the force of gravity, pivoted spring pressed chocks adapted to be forced inwardly by the car wheel to allow the car to pass on the rotating member, and outwardly over the rails to chock the wheels to prevent the rearward movement of the car, a sliding member normally rearwardly spring held, a pivoted latch carried by the rod and having an upwardly extending lug adapted to engage the forward end of the car to prevent the forward movement thereof, and a beveled lower face, a guide surrounding the latch and having a beveled portion adapted to engage the beveled face of the latch for raising the same, a pivoted arm outside of the rotating member and adapted to be operated by the incoming car, and said member operated by the arm and engaging the rod for operating the latch.

In testimony whereof I hereunto affix my signature.

EMMETT L. BAILEY.